3,057,913
UNSATURATED CYCLIC KETONES AND ESTERS AND PROCESSES FOR PREPARING SAME
Waldemar Guex, Bottmingen, and Marc Montavon, Basel, Switzerland, assignors to Hoffmann-La Roche Inc., Nutley, N.J., a corporation of New Jersey
No Drawing. Filed Nov. 23, 1959, Ser. No. 854,577
Claims priority, application Switzerland Dec. 12, 1958
15 Claims. (Cl. 260—488)

This invention relates to novel chemical compounds, novel starting materials therefor, and novel processes of preparing each of the foregoing classes of materials.

More particularly, the novel end products of the invention can be represented by the general formula (I)

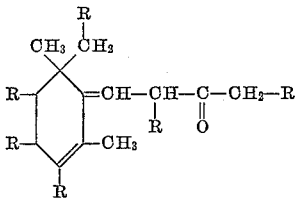

wherein each of the symbols R represents a member selected from the group consisting of hydrogen and lower alkyl radicals. The compounds of Formula I are useful as odorants for the compounding of perfume compositions and flavor compositions. These compounds possess fragrances generally reminiscent of violet and orris.

The invention also relates to a general process of preparing the above compounds of Formula I which comprises hydrolyzing compounds represented by the general formula (II)

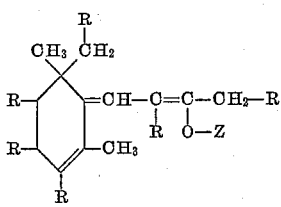

wherein the symbols R have the same significance stated above, and the symbol Z represents a member selected from the group consisting of lower alkyl radicals and lower alkanoyl radicals.

The starting materials for the processes referred to above, i.e. the compounds of Formula II, are also novel, and are also included in the invention.

The invention further provides processes of preparing compounds of Formula II, as will become apparent from the following description.

The starting materials of Formula II above used in the processes of the invention can be made from known compounds, represented collectively by the following general formula (III)

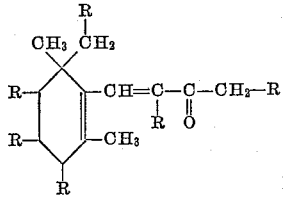

wherein the symbols R have the same significance stated above. Specific exemplars of the group represented collectively by above Formula III include 4-(2,6,6-trimethyl-1-cyclohexen-1-yl)-3-buten-2-one, 4-(2,5,6,6-tetramethyl-1-cyclohexen-1-yl)-3-buten-2-one, 4-(2,6-dimethyl-6-ethyl-1-cyclohexen-1-yl)-3-buten-2-one, 4-(2,6 - dimethyl-6-iso- butyl-1-cyclohexen-1-yl)-3-buten-2-one, 4-(2,6,6-trimethyl-yl-1-cyclohexen-1-yl)-3-methyl-3-buten-2-one, 5-(2,6,6-trimethyl-1-cyclohexen-1-yl)-4-methyl-4-penten-3-one and the like.

The ketones of general Formula III above can be converted to enol esters thereof, represented by general Formula IV (IV)

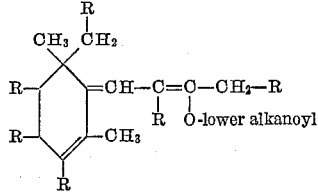

by a general process which comprises treating a ketone of Formula III with an anhydride of a lower alkanoic acid in the presence of an acidic condensing agent, e.g. p-toluenesulfonic acid, zinc chloride, and the like, or in the presence of an alkali metal- or alkaline earth metal salt of an acid corresponding to the anhydride employed, e.g. sodium acetate or calcium acetate when employing acetic anhydride.

An alternative general process for making the above mentioned enol esters of Formula IV comprises heating a ketone of Formula III, in the presence of an acidic condensing agent, such as those referred to above, with an enol ester of a ketone having a boiling point lower than that of the above mentioned ketone of Formula III; while continuously removing said lower boiling ketone, as it is liberated in the reaction. In a preferred mode of execution of this embodiment of the invention, a ketone of Formula III above is heated at temperatures between about 100° C. and about 140° C. with isopropenyl acetate in the presence of p-toluenesulfonic acid, while continuously distilling off the liberated acetone. There are thus obtained quite pure enol esters, in very good yields, as yellowish oils having characteristic absorption maxima in the ultraviolet spectrum. Purification of such enol esters (for example by distillation), for further conversion in the novel processes of the invention, is usually not required.

The ketones of general Formula III above can also be converted to enol ethers thereof, represented by the general Formula V (V)

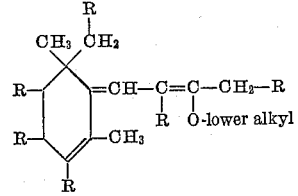

by a general process which comprises reacting a ketone of Formula III with an ortho ester of a lower aliphatic acid and a lower alkanol, i.e. with a lower alkyl ortho (lower alkanoate), in the presence of an acidic condensing agent, e.g. sulfuric acid, phosphoric acid, p-toluenesulfonic acid, boron trifluoride etherate, and the like. Particularly suitable for purposes of the invention are lower alkyl esters of orthoformic acid, preferably methyl-, ethyl- or n-butyl-orthoformate. The reaction is advantageously effected in the presence of a diluent, e.g. dioxan. The acetals formed as intermediate products can be directly converted under the conditions of reaction to the corresponding enol ethers by splitting off one mol of an alcohol. The splitting off of the alcohol can, however, also be effected as a separate reaction step, e.g. by treating the acetals formed, in the presence of an organic base, with phosphorus pentoxide. The enol ethers obtained are yellowish distillable oils having characteristic absorption maxima in the ultraviolet spectrum.

The enol esters of Formula IV can be converted to the end products of the invention, Formula I, by a general process which comprises hydrolyzing an ester of Formula IV, especially under mild alkaline conditions. Particularly suitable as hydrolytic agents for this purpose are aqueous solutions of alkali metal- and alkaline earth metal carbonates and -bicarbonates. The reaction is advantageously effected in a medium to which a water-miscible solvent (e.g. methanol, ethanol, dioxan, and the like) has been added, in order to obtain a homogeneous reaction mixture. A preferred mode of execution comprises refluxing an enol ester of Formula IV with sodium bicarbonate in 90% aqueous methanol for several hours.

The enol ethers of Formula V can be converted to the end products of the invention, Formula I, by a general process which comprises hydrolyzing an enol ether of Formula V, especially under mildly acidic conditions. Particularly suitable as hydrolytic agents for this purpose are phosphoric acid and organic acids, such as acetic acid, p-toluenesulfonic acid, and the like. It is often advantageous to work in an aqueous medium, and to add to the reaction mixture a water-miscible organic solvent (e.g. methanol, ethanol, acetone, dioxan, and the like), in order to obtain a homogeneous reaction mixture. A preferred mode of execution comprises allowing an enol ether of Formula V to stand at room temperatures in acetone solution, in the presence of one of the above mentioned acids, especially p-toluenesulfonic acid.

The invention is further disclosed in the following examples, which are illustrative but not limitative thereof. Temperatures are stated in degrees centigrade.

Example 1

A mixture of 673 g. of β-ionone, 700 g. of isopropenyl acetate and 3.5 g. of p-toluenesulfonic acid is heated at boiling temperature in a flask connected to a fractionation column until acetone no longer distills off. Then the reaction mixture is cooled, diluted with ether, washed neutral with water, and dried over sodium sulfate. The solvent is evaporated and the residue is distilled in high vacuum, yielding 690 g. of 4-(2,6,6-trimethyl-2-cyclohexen-1-ylidene)-2-acetoxy-2-butene; B.P. 105–111°/0.2 mm.; $n_D^{25}$=1.5370; U.V. maximum in ethanol at 278 m$\mu$, $E_1^1$=1262.

117 g. of the last mentioned product is dissolved in 1100 ml. of 90% methanol and refluxed for five hours in the presence of 50.4 g. of sodium bicarbonate. The reaction mixture is cooled, diluted with water and extracted with petroleum ether. The organic phase is washed neutral with water, dried with sodium sulfate and the solvent is evaporated. Upon distillation of the residue in high vacuum there is obtained 84.6 g. of 4-(2,6,6-trimethyl-2-cyclohexen-1-ylidene)-2-butanone; B.P. 83–85°/0.2 mm.; $n_D^{25}$=1.514; M.P. of semicarbazone, 167°; U.V. maximum in ethanol at 238 m$\mu$, $E_1^1$=935, shoulder at 235 m$\mu$.

Example 2

By reaction of 206 g. of β-irone with 200 g. of isopropenyl acetate in the presence of 1 g. of p-toluenesulfonic acid in accordance with the indications in Example 1, there is obtained 210 g. of 4-(2,5,6,6-tetramethyl-2-cyclohexen-1-ylidene)-2-acetoxy-2-butene; B.P. 110–120°/0.8–0.9 mm.; $n_D^{25}$=1.540; U.V. maximum in ethanol at 277 m$\mu$, $E_1^1$=930.

A mixture of 190 g. of the last mentioned product, 65 g. of sodium bicarbonate and 1800 ml. of 90% methanol is refluxed for five hours, and the reaction mixture obtained is worked up according to the indications in Example 1. There is obtained 125 g. of 4-(2,5,6,6-tetramethyl-2-cyclohexen-1-ylidene)-2-butanone; B.P. 101–104°/0.6 mm.; $n_D^{25}$=1.512; U.V. maximum in ethanol at 232 m$\mu$, $E_1^1$=630.

Example 3

21 g. of isomethyl-β-ionone is reacted with 20 g. of isopropenyl acetate in the presence of 0.1 g. of ethanesulfonic acid in accordance with the indications in Example 1. There is obtained 20.5 g. of 4-(2,6,6-trimethyl-2-cyclohexen-1-ylidene)-3-methyl-2-acetoxy-2-butene; B.P. 80–85°/0.1 mm.; $n_D^{25}$=1.532; U.V. maximum in ethanol at 280 m$\mu$, $E_1^1$=890.

18 g. of the last mentioned product is reacted with 7 g. of sodium bicarbonate and 190 ml. of 90% methanol according to the indications in Example 1. There is obtained 13 g. of 4-(2,6,6-trimethyl-2-cyclohexen-1-ylidene)-3-methyl-2-butanone; B.P. 55–60°/0.05 mm.; $n_D^{22}$=1.510; U.V. maximum in ethanol at 230 m$\mu$, $E_1^1$=600.

Example 4

100 g. of 4-(2,6-dimethyl-6-ethyl-1-cyclohexen-1-yl)-3-buten-2-one, 72 ml. of isopropenyl acetate and 0.5 g. of p-toluene-sulfonic acid are heated in an oil bath at 100°–140°, thus distilling off acetone. Further processing is effected according to the indications in Example 1; there is thus obtained 120 g. of crude 4-(2,6-dimethyl-6-ethyl-2-cyclohexen-1-ylidene)-2-acetoxy-2-butene as an oily substance having a refractive index $n_D^{24}$=1.5310. Upon distillation in high vacuum there is obtained as the main fraction 102 g. of the purified enol ester, having B.P. 80–85°/0.03 mm.; $n_D^{25}$=1.5320; U.V. maximum at 278 m$\mu$, $E_1^1$=688.

36 g. of the crude ester referred to above, 15 g. of sodium bicarbonate and 330 ml. of 90% methanol are reacted and worked up according to the indications in Example 1, yielding 24 g. of 4-(2,6-dimethyl-6-ethyl-2-cyclohexen-1-ylidene)-2-butanone; B.P. 70–75°/0.05 mm.; $n_D^{24}$=1.5090; U.V. maximum in ethanol at 232 m$\mu$, $E_1^1$=600.

Example 5

A mixture of 19.2 g. of β-ionone, 16.3 of ethyl orthoformate and 20 ml. of dioxan is mixed with 1 ml. of a 5% solution of sulfuric acid in dioxan and allowed to stand for one hour at 20°. The reaction mixture is then poured into ice water, taken up in petroleum ether and the petroleum ether extract is washed with sodium bicarbonate and then with water to neutrality. The solvent is distilled off, yielding 13.7 g. of 4-(2,6,6-trimethyl-2-cyclohexen-1-ylidene)-2-ethoxy-2-butene; B.P. 87°/0.04 mm.; $n_D^{25}$=1.5288; U.V. maximum in ethanol at 288 m$\mu$, $E_1^1$=1075.

A mixture of 10 g. of the last mentioned product, 100 ml. of acetone and 0.05 g. of p-toluenesulfonic acid is allowed to stand for two hours at room temperature. The reaction mixture is poured into the double amount of water and extracted with petroleum ether. The petroleum ether solution is washed with sodium bicarbonate solution and then several times with water, dried and finally concentrated under diminished pressure. There is obtained in this manner 8 g. of a mixture which, in addition to a little α and β-ionone, comprises mainly 4-(2,6,6-trimethyl-2-cyclohexen-1-ylidene)-2-butanone; M.P. of the semicarbazone, 167°–170°.

We claim:

1. A compound represented by the general formula

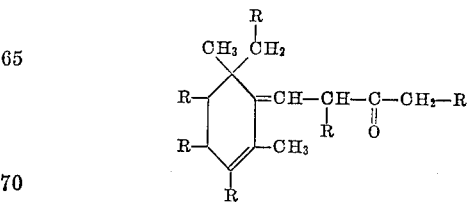

wherein each of the symbols R represents a member selected from the group consisting of hydrogen and lower alkyl radicals.

2. A process which comprises hydrolyzing under mildly alkaline conditions with a hydrolytic agent selected from the group consisting of alkali metal carbonates, alkali metal bicarbonates, alkaline earth metal carbonates, and alkaline earth metal bicarbonates in an aqueous medium containing a water miscible organic solvent, a compound represented by the general formula

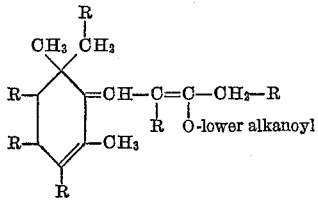

thereby producing a compound represented by the general formula

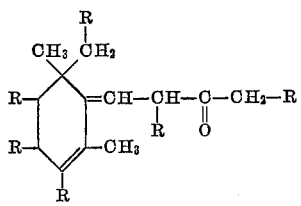

wherein, in each of the foregoing formulas, each of the symbols R represents a member selected from the group consisting of hydrogen and lower alkyl radicals.

3. A process which comprises hydrolyzing under mildly acidic conditions with a hydrolytic agent selected from the group consisting of phosphoric acid and organic acids, a compound represented by the general formula

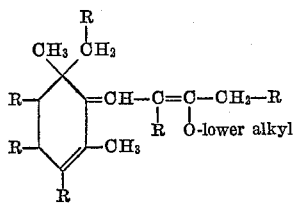

thereby producing a compound represented by the general formula

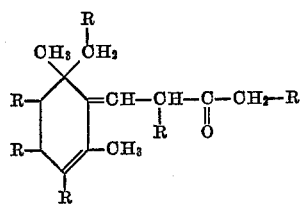

wherein, in each of the foregoing formulas, each of the symbols R represents a member selected from the group consisting of hydrogen and lower alkyl radicals.

4. 4 - (2,6,6 - trimethyl-2-cyclohexen-1-ylidene)-2-butanone.

5. 4-(2,5,6,6-tetramethyl - 2 - cyclohexen - 1 - ylidene)-2-butanone.

6. 4-(2,6,6-trimethyl-2-cyclohexen-1-ylidene)-3-methyl-2-butanone.

7. 4 - (2,6 - dimethyl-6-ethyl-2-cyclohexen-1-ylidene)-2-butanone.

8. A compound represented by the general formula

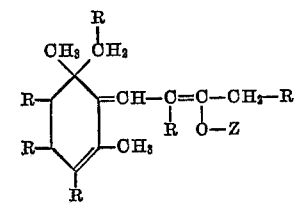

wherein each of the symbols R represents a member selected from the group consisting of hydrogen and lower alkyl radicals, and the symbol Z represents a member selected from the group consisting of lower alkyl radicals and lower alkanoyl radicals.

9. 4-(2,6,6-trimethyl-2-cyclohexen-1-ylidene)-2-acetoxy-2-butene.

10. 4 - (2,5,6,6 - tetramethyl-2-cyclohexen-1-ylidene)-2-acetoxy-2-butene.

11. 4 - (2,6,6 - trimethyl - 2 - cyclohexen -1-ylidene)- 3-methyl-2-acetoxy-2-butene.

12. 4 - (2,6-dimethyl-6-ethyl-2-cyclohexen-1-ylidene)-2-acetoxy-2-butene.

13. 4-(2,6,6-trimethyl-2-cyclohexen-1-ylidene)-2-ethoxy-2-butene.

14. A process of making a compound represented by the general formula

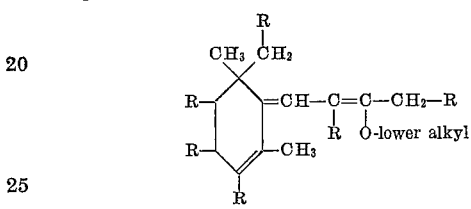

which comprises reacting a compound represented by the general formula

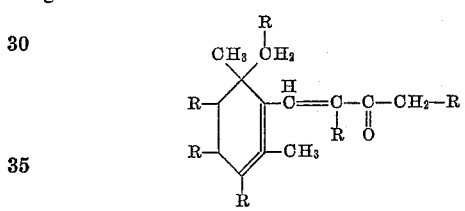

with a lower alkyl ester of orthoformic acid in the presence of an acidic condensing agent; wherein in each of the foregoing formulas, each of the symbols R represents a member selected from the group consisting of hydrogen and lower alkyl radicals.

15. A process of making a compound represented by the general formula

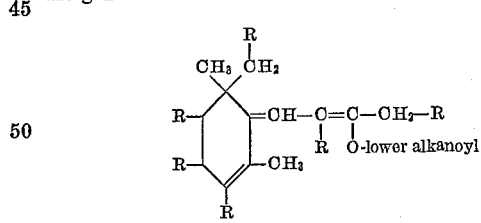

which comprises reacting, in the presence of an acidic condensing agent, a compound represented by the formula

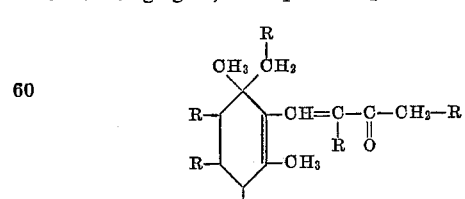

with an enol ester of a ketone having a lower boiling point than that of the ketone represented by the immediately preceding formula; wherein in each of the foregoing formulas, each of the symbols R represents a member selected from the group consisting of hydrogen and lower alkyl radicals.

No references cited.